(12) United States Patent
Mizobuchi

(10) Patent No.: US 6,237,221 B1
(45) Date of Patent: May 29, 2001

(54) METHOD OF FIXING IMPELLER BLADES OF A TORQUE CONVERTER

(75) Inventor: Naoki Mizobuchi, Toyonaka (JP)

(73) Assignee: Exedy Corporation, Osaka (JP)

(*) Notice: Subject to any disclaimer, the term of this patent is extended or adjusted under 35 U.S.C. 154(b) by 0 days.

(21) Appl. No.: 09/384,218

(22) Filed: Aug. 27, 1999

(30) Foreign Application Priority Data

Sep. 3, 1998 (JP) .................................................. 10-249721

(51) Int. Cl.[7] ........................................................ B23P 15/00

(52) U.S. Cl. ............................ 29/889.5; 29/889.2; 29/505

(58) Field of Search ................................ 29/889.5, 889.2, 29/505; 60/330, 331; 416/180

(56) References Cited

U.S. PATENT DOCUMENTS

| 4,584,835 | * | 4/1986 | Nishi | 29/889.5 |
| 5,868,025 | * | 2/1999 | Fukuda et al. | 29/889.5 |
| 5,946,962 | * | 9/1999 | Fukuda et al. | 29/889.5 |

* cited by examiner

*Primary Examiner*—I. Cuda Rosenbaum
(74) *Attorney, Agent, or Firm*—Shinjyu Global IP Couselors, LLP

(57) ABSTRACT

An impeller blade fixing method for a torque converter includes a fitting step and a caulking step. In the fitting step, projections (17), (18) and (19) of the impeller blades (3) are fitted into concavities (6), (7) and (8) formed on an inner surface of an impeller shell (2), respectively. In a caulking step, a portion (10) of the impeller shell (2) adjacent to one of the projections of each blade (3) is deformed thereby fixing each impeller blade (3) to the impeller shell (2). In the caulking step, only a portion of a surface (B) of the impeller shell (2) opposite the portion 10 is supported.

10 Claims, 5 Drawing Sheets

METHOD OF FIXING IMPELLER BLADES OF A TORQUE CONVERTER

BACKGROUND OF THE INVENTION

A. Field of the Invention

The invention relates to a method of fixing impeller blades to an impeller shell of a torque converter.

B. Description of the Related Art

A torque converter has three kinds of vane wheels, an impeller, a turbine and a stator, all arranged in an annular fluid-filled chamber defined in the torque converter. The vane wheels are adapted to transmit torque from an input rotary member to an output rotary member via working fluid in the annular fluid-filled chamber. The impeller includes an impeller shell, a large number of circumferentially spaced apart impeller blades located inside the impeller shell and an annular impeller core fixed to radially inward sides of the impeller blades.

In a conventional impeller, each impeller blade is fixed to the impeller shell in the following manner. First, the impeller shell is formed with a plurality of concavities or recesses via an embossing or deformation process. Next, the impeller blades are each formed with a plurality of projections. Next, the projections are fitted into -the concavities or recess of the impeller shell. Finally, the impeller blades are fixed to the impeller shell by brazing, or another similar welding process.

When the brazing or other similar welding process is employed for fixing the impeller blades to the impeller shell, the impeller blades and portions of the impeller shell are heated causing the impeller shell to be thermally deformed, often to a large extent.

Another method of fixing impeller blades includes forming concavities in the impeller shell, inserting tabs formed on the impeller blades into the concavities, then caulking a portion near the concavity by punching or otherwise deforming the impeller blade and/or. impeller shell. The second method is less expensive than the first method that employs brazing.

In the conventional fixing method, however, caulking, e.g., punching causes deformation in the impeller shell. This is because the outer surface of the impeller shell is entirely supported on a support base, and a portion of the support base that bears the punching load may vary each time the punching is performed. For example, if the portion bearing the load is spaced apart slightly from the portion of the impeller shell being caulked, or if the portion bearing the load is not uniformly shaped to conform to the shape of the impeller shell, the impeller shell may be deformed to a large and undesirable extent. The state or manner of deformation may also change depending on the lot of the impeller. The fixing method utilizing caulking likewise can cause large amounts of unwanted deformation in the impeller shell.

SUMMARY OF THE INVENTION

An object of the invention is to suppress deformation of an impeller shell, which occurs when impeller blades are fixed to the impeller shell.

In accordance with one aspect of the present invention, there is a method for fixing a plurality of impeller blades to an impeller shell of a torque converter, each of the impeller blades having a plurality of projections, the impeller shell having a plurality of concavities formed on an inner surface thereof for receiving the projections on the impeller blades. The method includes the steps of:

fitting -the projections of the impeller blades into the concavities in the impeller shell; and caulking an inner surface of the impeller shell while supporting only an outer surface of the impeller shell at areas adjacent to -the concavities, thereby deforming portions of the impeller shell fixing each of the impeller blades to the impeller shell.

Preferably, in the caulking step, the deformed portions of the impeller shell are formed at a radially inward position of the impeller shell, with respect to a rotational axis of the impeller shell.

Preferably, in the caulking step, the deformed portions of the impeller shell contact and partially extend over a radially inward portion of respective impeller blades.

Preferably, in the caulking step, the deformed portions of the impeller shell partially extend over a radially inward portion of corresponding concavities formed in the impeller shell.

Preferably, the method also includes the steps of:

forming the impeller shell with three concentric rows of concavities before said fitting step;

forming each impeller blade with three projections corresponding to the three concentric rows of concavities before said fitting step; and wherein in said caulking step, the deformed portions are located proximate only the radially innermost row of concavities of the three concentric rows of cavities, with respect to a rotational axis of the impeller shell.

Preferably, in the caulking step, the deformed portions of the impeller shell contact and partially extend over a radially inward portion of respective impeller blades.

As a result of the above aspect of the present invention, caulking of a portion of the impeller shell is performed while supporting only an outer surface of the deformed portion of the impeller shell. Therefore, deformation occurs to a lesser extent than in the prior art.

According to the above impeller blade fixing method, unwanted distortion of the impeller shell can be suppressed.

According to the above impeller blade fixing method, the deformed portion is created by deformation of the impeller shell at a location adjacent to a radially inward portion of the impeller blade, thereby forcing the projections formed on the impeller blades into firm contact with their respective concavities ensuring the rigid retention of the impeller blades in the impeller shell.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

Figure 1:
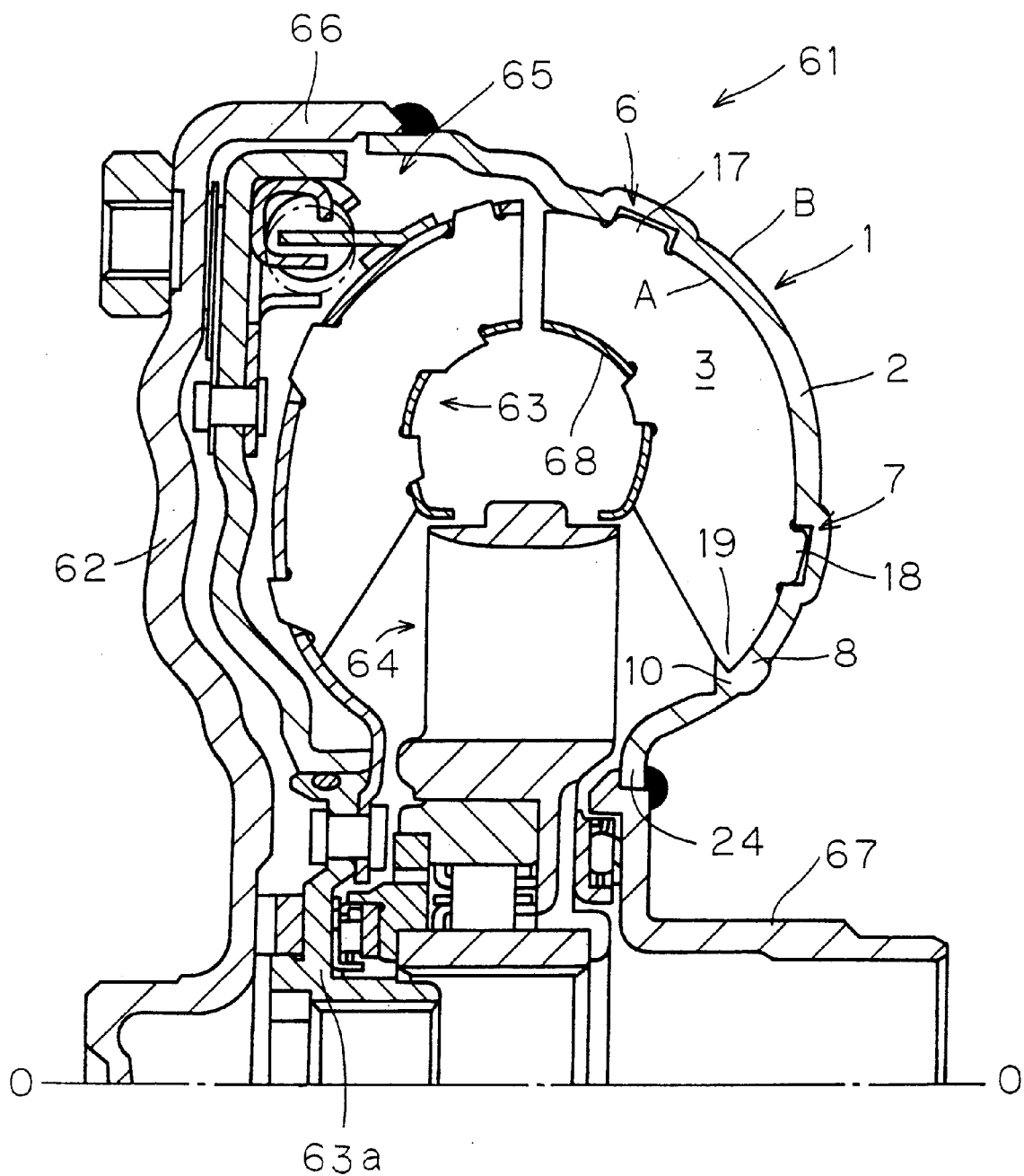
FIG. 1 is a fragmentary, cross-sectional side view of a torque converter in accordance with a first embodiment of the present invention.

FIG. 1 shows a torque converter 61 in accordance with a first embodiment of the present invention. In FIG. 1, the torque converter 61 has a rotation axis 0—0. An engine (not shown) is arranged on the left side in FIG. 1, and a transmission (not shown) is arranged on the right side in FIG. 1. Hereinafter, the term engine side refers to a direction toward the left side of FIG. 1, and the term transmission side refers to a direction toward the right side of FIG. 1.

In the torque converter 61, a working fluid chamber filled with working fluid or oil is defined by a disk shaped front cover 62 and an impeller shell 2 of an impeller 1. The impeller shell 2 is welded to an outer peripheral wall 6 of the front cover 62.

The torque converter 61 includes the impeller 11 a turbine 63, a stator 64 and a lockup device 65 all disposed within a working fluid chamber defined within the torque converter 61.

The front cover 62 is typically connected to a flex plate (not shown) that is further connected to a crankshaft (not shown) of the engine (not shown) thereby receiving torque transmitted from the crankshaft of the engine. The turbine 63 is located within the working fluid chamber facing the impeller 1. The turbine 63 has a radially inner hub 63a that can be coupled to a transmission input shaft (not shown) of the transmission for outputting torque front the torque converter 61. The stator 64 is located between radially inner portions of the impeller 1 and the turbine 63.

Figure 5:
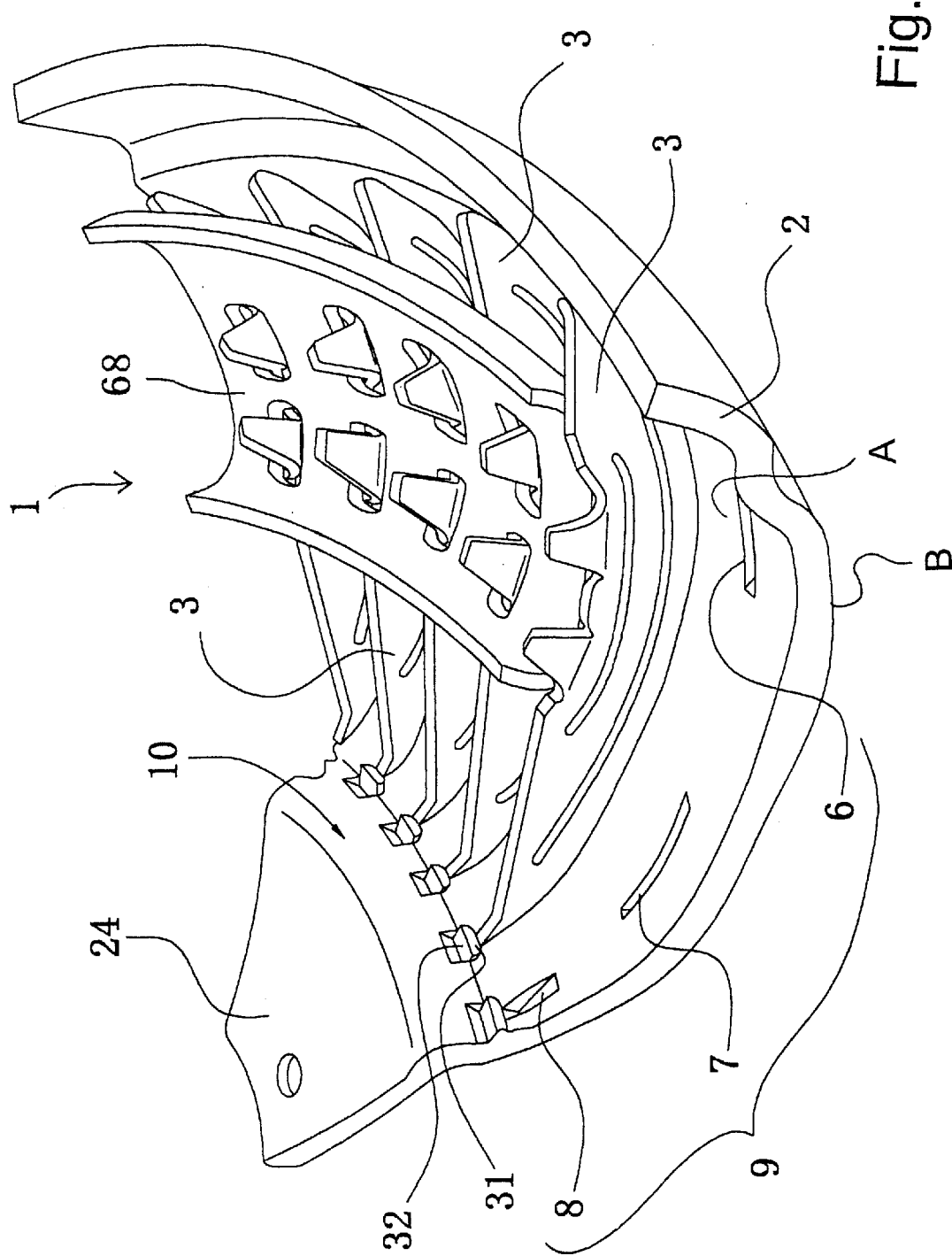
FIG. 5 is a fragmentary perspective view showing the impeller shell with impeller blades installed and further having an impeller core installed on the impeller blades.

The impeller 1 is formed by the impeller shell 2 a plurality of, impeller blades 3 and an impeller core 68. The plurality of impeller blades 3 are fixed to an inner side of the impeller shell 2, and the annular impeller core 68 is fixed to an inner side of the impeller blades 3, as shown in FIGS. 1 and 5. An impeller flub 67 is fixed to the radially inner portion of the impeller shell 2.

Figure 2:
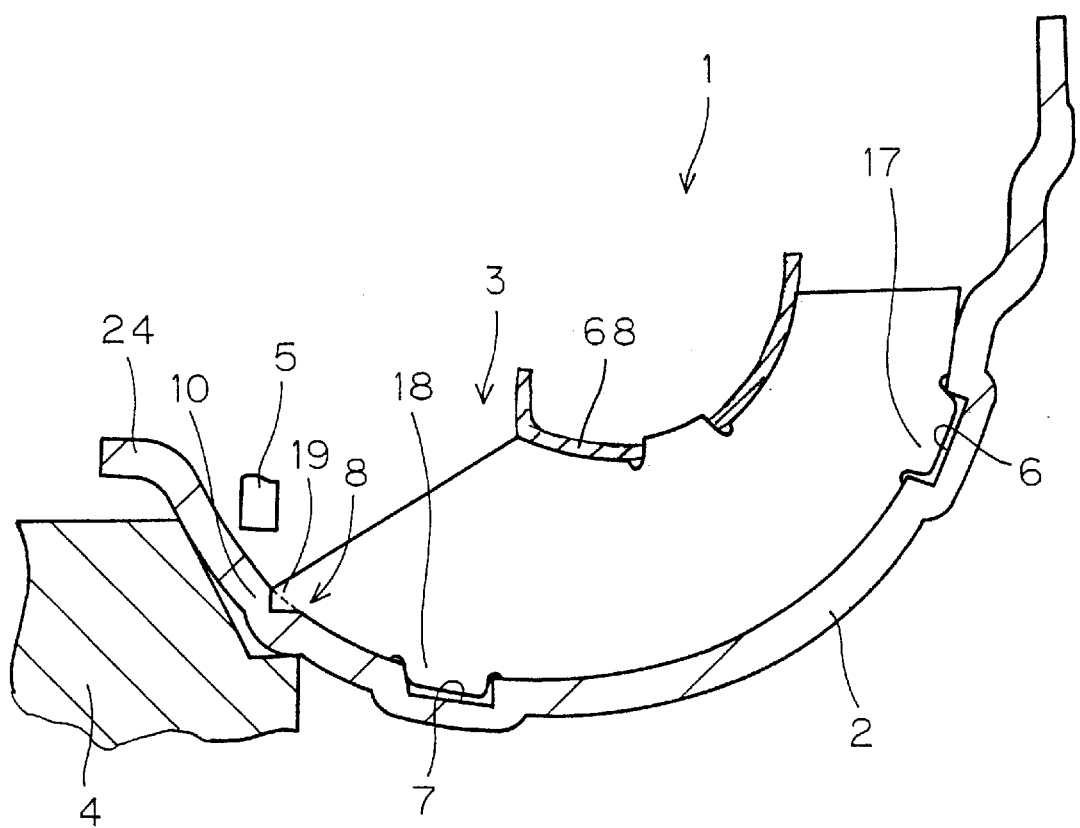
FIG. 2 is a fragmentary, cross-sectional side view showing an assembly step of an impeller of the torque converter depicted in FIG. 1, with an impeller blade being fitted into an impeller shell.

As shown in FIG. 2, the impeller shell 2 is formed of a substantially circular plate having an arc shaped when viewed in cross-sectionally, and is provided at a radially inner portion with a flat flange 24. The flange 24 is welded to the impeller hub 67, as shown in FIG. 1. An inner surface of the arc-shaped portion of the impeller shell 2 is provided with a plurality of embossed portions 6, 7 and 8. In FIG. 2, only one set of the embossed portions 6, 7 and 8 are depicted. However, circumferentially spaced apart rows of the embossed portions 6, 7 and 8 are formed on the surface of the impeller shell 2. Further, as is indicated in FIG. 5, each radially extending row 9, consisting of one embossed portion 6, one embossed portion 7 and one embossed portion 8, corresponds to inter-fitting blade tabs 17, 18 and 19 (described below) formed on a single impeller blade 3. A plurality of rows 9 of embossed portions 6, 7 and 8 are formed on the surface of the impeller shell 2 for receiving the blade tabs 17, 18 and 19 of a corresponding plurality of impeller blades 3.

Each of the embossed portions 6, 7 and 8 form indentations in the surface of the impeller shell 2. The indentations may also be thought of as recesses or concavities that are shaped -to receive the blade tabs 17, 18 and 19 in a manner further described below.

The radially outer embossed portions 6 are arranged forming a row in -the circumferential direction. The radially middle embossed portions 7 are likewise arranged in the circumferential direction to form a row in the circumferential direction. The radially inner embossed portions 8 are likewise arranged in the circumferential direction. Thereby, a plurality of circumferential concavity rows are formed in a concentric fashion. Each of the embossed portions 6, 7 and 8 forms a concavity or recess on the inner surface A (see FIG. 1) of the impeller shell 2, and thus the concavities defined by the embossed portions 6, 7 and 8 are open toward the working fluid chamber of the torque converter 61. Further, on an outer side B of the impeller shell 2, there are corresponding protruding portions.

Each impeller blade 3 is formed of an impeller blade body having a three-dimensional curved surface. Each impeller blade body is provided with a plurality of blade tabs 17, 18 and 19. More specifically, the three blade tabs 17, 18 and 19 extend outward from the edge of each impeller blade body. When fitted to the impeller shell 2, the impeller blades 3 extend radially along an inner surface A of the impeller shell 2. The impeller blades 3 are positioned in the impeller shell 2 such that the blade tabs 17, 18 and 19 are arranged correspondingly to the rows 9 of the embossed portions, respectively. The radially outer, middle and inner tabs 17, 18 and 19 of each impeller blade 3 are fitted into the radially outer, middle and inner embossed portions 6, 7 and 8, respectively.

Description is now provided for the impeller blades 3 fixed to the impeller shell 2.

Figure 4:
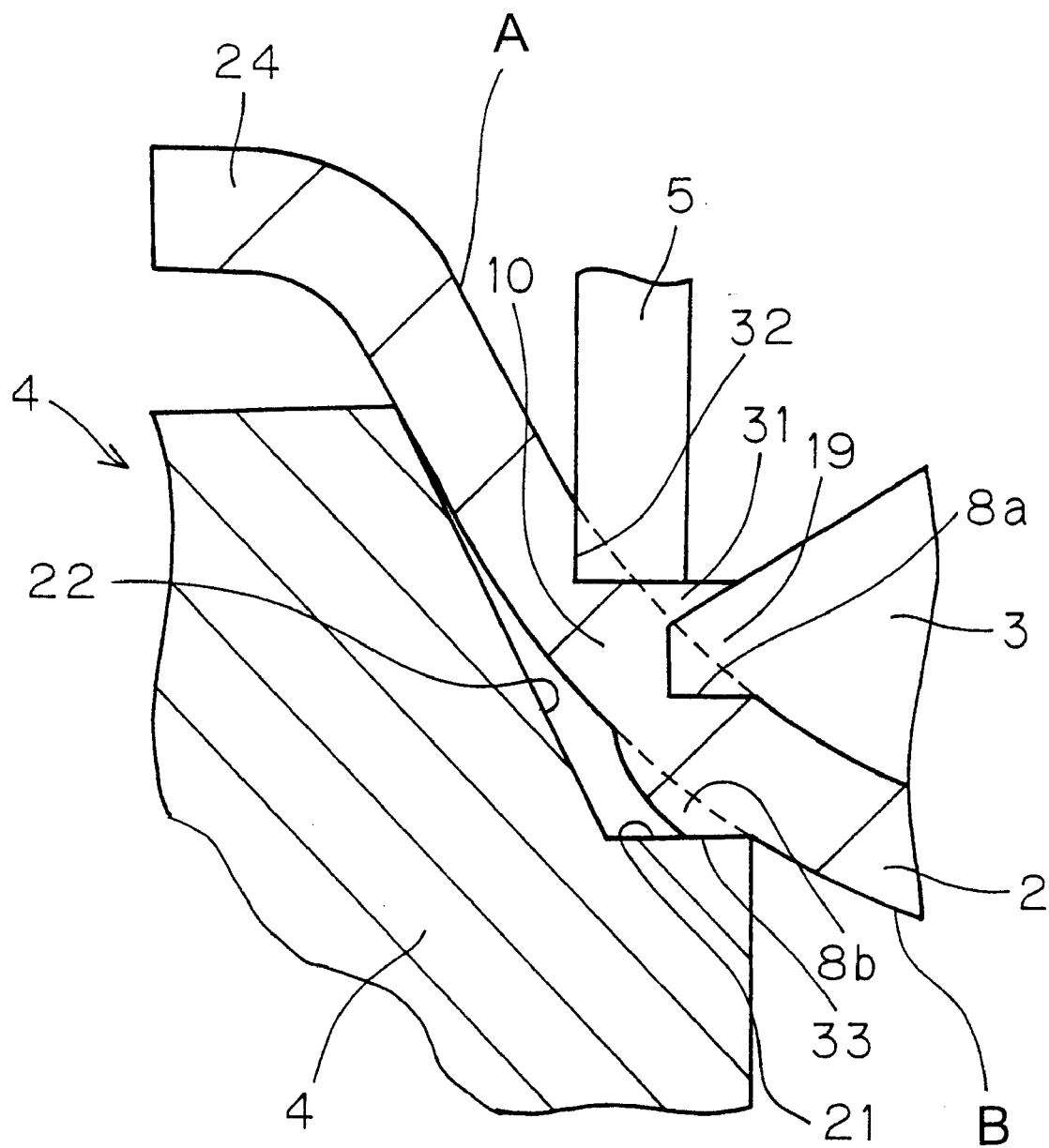
FIG. 4 is a fragmentary, cross-sectional side view similar to FIG. 3, showing the impeller blade being fixed to the portion of the impeller shell by caulking.

In brief, as shown in FIG. 4, a portion around each inner embossed portion 8 is plastically deformed and thereby is strongly pressed against the radially inner tab 19. This forces the impeller blade 3 radially outward with respect to the axis 0—0 so that the blade tabs 17, 18 and 19 are firmly fitted with the embossed portions 6, 7 and 8, respectively. More specifically, each inner embossed portion 8 has a concavity 8a at its inner side, and also has a convexity 8b at its outer side. A concavity 32 is formed in a corresponding portion 10 radially inside the concavity 8a. A plastically deformed portion 31, which is in contact with the inner surface of the radially inner tab 19, is formed radially outside the concavity 32. A flat surface 33 is formed on a portion of each convexity 8b.

A more detailed description is now provided on the method of manufacturing the impeller 1.

In a preparatory step, embossing is effected on the impeller shell 2 to form the embossed portions 6, 7 and 8. Also, the impeller blades 3 are formed with the blade tabs 17, 18 and 19 by, for instance, die-cutting.

Figure 3:
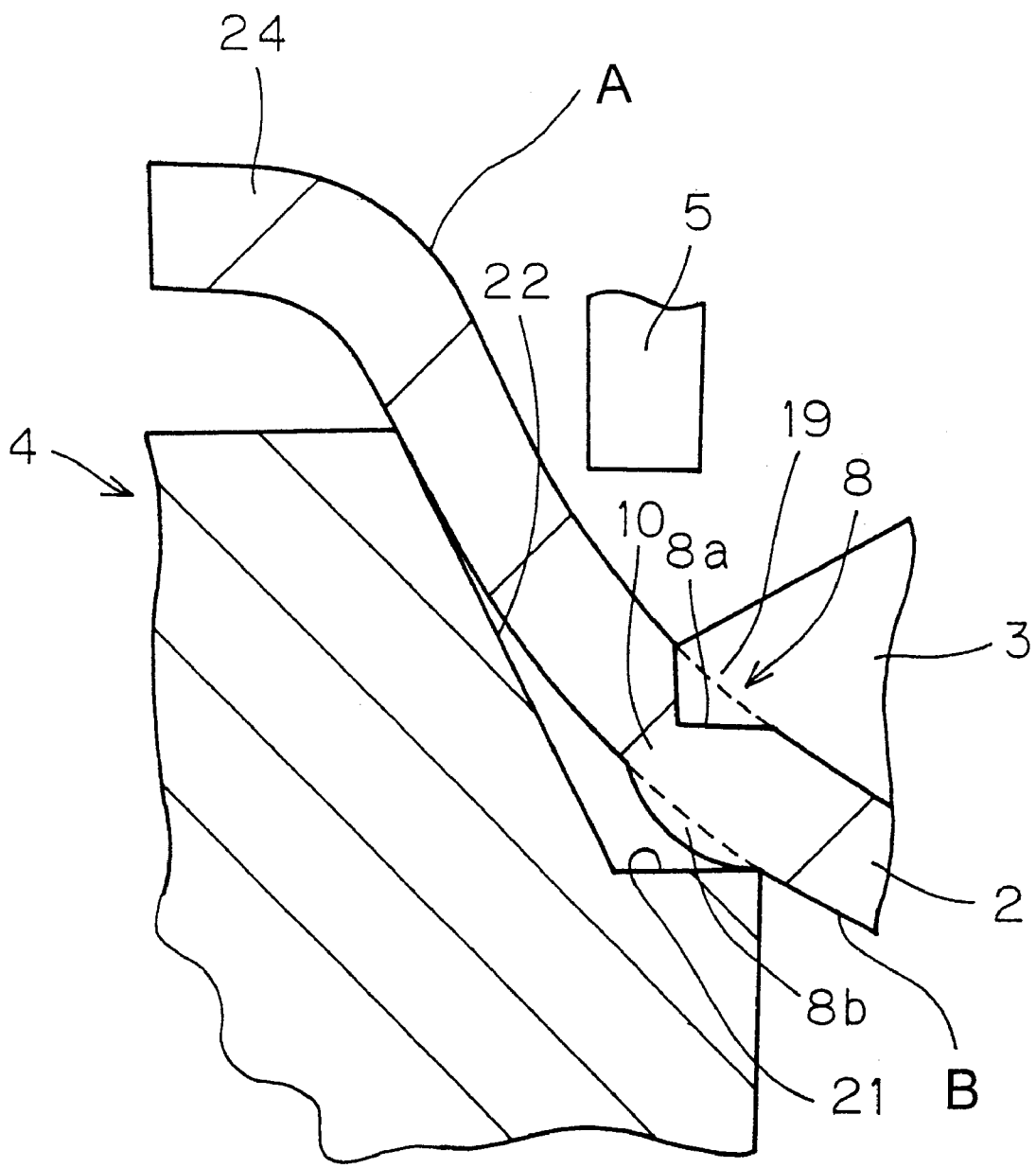
FIG. 3 is a fragmentary, cross-sectional side view showing, on an enlarged scale, a portion of the impeller shell and impeller blade depicted in FIG. 2.

In a fitting step, the plurality of impeller blades 3 are fitted to the impeller shell 2. Specifically, each of the blade tabs 17, 18 and 19 is fitted into corresponding concavities defined by the embossed portions 6, 7 and 8. Thereafter, the impeller core 68 is set on the impeller blades 3, as shown in FIG. 5. The impeller shell 2 and the impeller blades 3 are then laid on a support base 4, as shown in FIG. 3. The support base 4 supports only the portions of the outer surface of impeller shell 2 corresponding to the radially inner embossed portions 8 formed on the inner surface A of the impeller shell 2.

More specifically, the support base 4 has a first support surface 21 which supports the outer surface of the impeller shell 2 corresponding to the inner embossed portion 8. Since the impeller shell 2 has an annular or circular shape, the support base 4 may also have a ring or annular shape for supporting only that portion of the outer surface of the impeller shell which corresponds to the inner embossed portions 8 of the impeller shell 2. The support base 4 also has a second support surface 22 that supports a portion radially inward of the impeller shell 2 adjacent to the inner embossed portion 8.

It should be understood that the first and second support surfaces 21 and 22 are annular in shape as well. For instance, the first support surface 21 is preferably a flat annular shaped surface lying in a plane that is perpendicular to the axis 0—0. Alternatively, the first support surface 21 may be slightly inclined with respect to the axis 0—0. The second support surface 22 has a conical shape and is inclined with respect to the axis 0—0.

The first support surface 21 does not protrude radially inward beyond the inner embossed portion 8, but rather ends at a point that is approximately radially aligned with the embossed portion 8. The second support surface 22 extends radially inward from the first support surface 21 and supports the outer surface of the portion radially inward from the inner embossed portion 8 and the corresponding portion 10 of the impeller shell 2. In this manner, the impeller shell 2 is radially supported by the support base 4. The first and second support surfaces 21 and 22 are spaced apart from the corresponding portion 10 to allow for deformation of the portion 10, as is described in greater detail below.

After setting the impeller shell 2 with the blades 3 installed on the support base 4 as described above and shown in FIG. 3, the portions 10 of the impeller shell 2 are plastically deformed by a punch 5. As shown in FIG. 3, the punch 5 is brought into contact with a portion of the impeller shell just above the portion 10. Thereafter, as shown in FIG. 4, the punch 5 moves in an axial direction (parallel to the axis 0—0) so that the concavity 32 is formed in the impeller shell 2 by deforming the portion of the impeller shell 2 radially inward from and adjacent to the blade tab 19. Consequently, as shown in FIGS. 4 and 5, the portion 10 is plastically deformed to create the deformed portion 31, which covers a radially inner side of the blade tab 19. Further, a flat surface 33 is formed on a portion of convexity 8b on the outer surface B of the impeller shell 2. Since the impeller shell 2 is in contact with the support base 4 mainly at the convexities 8b, only the convexities 8b are deformed thereby forming the surface 33. In other words, there is preferably no other deformation of the outer surface B of the impeller shell 2

A plurality of punches 5 corresponding to all the embossed portions 8 may be used such that deformation of the portions 10 of the impeller shell 2 may be deformed simultaneously in a single deforming operation. Alternatively, the caulking may be effected on a blade by blade basis where the deformation occurs successively in a circumferential direction about the impeller shell 2.

Owing to the caulking process described above, the impeller blades 3 are fixed to the impeller shell 2. By deforming the portion 10 to form the deformed portion 31, the impeller blade 3 is retained in the impeller shell 2. Specifically, as is shown in FIG. 1, the blade tab 17 is retained in the embossed portion 6. Since the blade tab 17 extends radially upward (with respect to the orientation in FIG. 1) into the embossed portion 6, the blade 3 is not able to move toward the left side of FIG. 1. Further, the deformed portion 31 extends radially outward over the portion of the blade 3 adjacent to the embossed portion, further restricting the embossed portion 8. Since each blade tab 18 extends into each embossed portion 7, the blades 3 cannot twist or rotate. Therefore, the impeller blades 3 are securely held in the impeller shell by the deformation that forms the deformed portion 31.

According to the method described above, it is only each concavity 8b that is supported by the support base 4 and is subjected to a deformation load. Therefore, deformation in other portions of the impeller shell 2 is suppressed. The reason for this is as follows:

(1) It is only a portion of the impeller shell 2 that is supported in the caulking process, and the whole impeller shell 2 is not supported in contrast to the prior art.

This prevents possible changes in the dimensions of other portions of the impeller that would otherwise be supported during such deformation processes that may occur depending upon the configuration of the torque converter being produced.

(2) The portion supported in the caulking operation is located directly behind the portion being subjected to caulking.

The above suppresses an influence which may be exerted by the caulking on the other portions of the impeller shell 2.

(3) The portion supported in the caulking operation is in the vicinity of each innermost embossed portion 8 in the radially innermost row.

This suppresses an influence which may be exerted by the caulking on the portions of the impeller shell radially outside the embossed portion 8. In particular, the support base 4 supports only the inner embossed portions 8 in the radially innermost side thereof so that the distortion due to the caulking is absorbed in a diametrical manner in the vicinity of the inner embossed portions 8.

Owing to the above, deformation can be suppressed in each product, and variations in deformation between the products can be small.

Further, this method is less expensive than the brazing methods currently employed for securing impeller blades in an impeller shell. Since the radially middle and outer portions of the impeller shell 2 are not restrained, this improves the flexibility of the impeller blade 3. Since only the radially inner portion of the impeller blade 2 is caulked, the punch 5 can be integral and aligned with the support base 4. This improves the overall strength and lifetime of the punch 5.

According to the impeller blade fixing method described above for the torque converter of the present invention, only the corresponding portions of the impeller shell are supported in the caulking step. Therefore, deformation can be suppressed to a greater extent than in the prior art.

Various details of the invention may be changed without departing from its spirit or scope. Furthermore, the foregoing description of the embodiments according to the present invention is provided for the purpose of illustration only, and not for the purpose of limiting the invention as defined by the appended claims and their equivalents.

What is claimed is:

1. A method for fixing a plurality of impeller blades to an impeller shell of a torque converter, each of the impeller blades having a plurality of projections, the impeller shell having a plurality of concavities formed on an inner surface thereof for receiving the projections on the impeller blades, the method comprising the steps of:

fitting the projections of the impeller blades into the concavities in the impeller shell; and caulking an inner surface of the impeller shell while supporting only convexities located on an outer surface of the impeller shell at areas adjacent to the concavities, thereby deforming portions of the impeller shell fixing each of the impeller blades to the impeller shell.

2. The impeller blade fixing method according to claim 1, wherein in said caulking step, the deformed portions of the impeller shell are formed at a radially inward position of the impeller shell, with respect to a rotational axis of the impeller shell.

3. The impeller blade fixing method according to claim 2, wherein
in said caulking step, the deformed portions of the impeller shell contact and partially extend over a radially inward portion of respective impeller blades.

4. The impeller blade fixing method according to claim 3 wherein,
in said caulking step, the deformed portions of the impeller shell partially extend over a radially inward portion of corresponding concavities formed in the impeller shell.

5. The impeller blade fixing method according to claim 1, further comprising the steps of:
forming the impeller shell with three concentric rows of concavities before said fitting step;
forming each impeller blade with three projections corresponding to the three concentric rows of concavities before said fitting step; and
wherein in said caulking step, the deformed portions are located proximate only the radially innermost row of concavities of the three concentric rows of cavities, with respect to a rotational axis of the impeller shell.

6. The impeller blade fixing method according to claim 5, wherein
in said caulking step, the deformed portions of the impeller shell contact and partially extend over a radially inward portion of respective impeller blades.

7. The impeller blade fixing method according to claim 6, wherein
in said caulking step, the deformed portions of the impeller shell partially extend over a radially inward portion of corresponding concavities formed in the impeller shell.

8. A method for fixing a plurality of impeller blades to an impeller shell of a
torque converter, the method comprising the steps of:
forming the impeller shell with three concentric rows of concavities;
forming each impeller blade with three projections corresponding to the three concentric rows of concavities;
fitting the projections of the impeller blades into the concavities in the impeller shell;
caulking an inner surface of the impeller shell while supporting only convexities located on an outer surface of the impeller shell at areas adjacent to the concavities, thereby deforming portions of the impeller shell fixing each of the impeller blades to the impeller shell; and
wherein in said caulking step, the deformed portions are located proximate only the radially innermost row of concavities of the three concentric rows of cavities, with respect to a rotational axis of the impeller shell.

9. The impeller blade fixing method according to claim 8, wherein
in said caulking step, the deformed portions of the impeller shell contact and partially extend over a radially inward portion of respective impeller blades.

10. The impeller blade fixing method according to claim 9, wherein
in said caulking step, the deformed portions of the impeller shell partially extend over a radially inward portion of corresponding concavities formed in the impeller shell.

* * * * *